Oct. 29, 1935.  E. G. CARROLL  2,018,912
HYDRAULIC BRAKE APPARATUS FOR HEAVY VEHICLES
Filed Nov. 11, 1930  3 Sheets-Sheet 1

Inventor
Eugene G. Carroll;
By Lyon & Lyon
Attorneys

Patented Oct. 29, 1935

2,018,912

UNITED STATES PATENT OFFICE 2,018,912

HYDRAULIC BRAKE APPARATUS FOR HEAVY VEHICLES

Eugene G. Carroll, Los Angeles, Calif., assignor, by mesne assignments, to Bendix Brake Company, South Bend, Ind., a corporation of Illinois Application November 11, 1930, Serial No. 494,993
In Great Britain November 11, 1929

23 Claims. (Cl. 188—152)

This invention relates to hydraulic brake apparatus. The braking power of trucks is generally found inadequate to stop a truck within a sufficiently short distance to prevent accidents, particularly where the trucks are heavy and carrying a heavy load. One of the difficulties appears to be that there is insufficient brake area. This difficulty in hydraulic brake apparatus can be overcome to a certain extent by increasing the hydraulic pressure. However, in trucks that are already in use the brake drums are, of course, designed for the intended working pressure and it would be dangerous to increase the hydraulic pressure very considerably above that at which the brakes are intended to operate. In trucks of 6-wheel type, if hydraulic brakes are installed on all the wheels, the actuation of the usual brake pedal does not readily develop sufficient operating pressure in the brake cylinders. This is due partly to the increased number of brake cylinders.

The general object of this invention is to provide hydraulic brake apparatus in which the hydraulic pressure can be very readily raised to a point much higher than ordinarily used and to provide means to develop a relatively large displacement volume in the pressure developing means to enable a large number of brake cylinders to be served effectively with the liquid under pressure, for example, in 6-wheel brake installations; also to provide a construction at the pressure to be employed at the brake-drums without subjecting the same to dangerous strains.

The invention may be applied in a new installation of hydraulic brakes, but one of my objects is to provide a construction which may be applied as an attachment to hydraulic brake apparatus already installed in a car to enable the hydraulic pressure to be readily increased as may be desired, for example, with my improvement the hydraulic pressure in applying the brakes can be raised from 250 or 300 pounds per square inch to approximately 500 or 600 pounds per square inch.

One of the difficulties in developing a high pressure in the present systems is that the brake is usually applied by a foot lever giving a stroke of about an inch and a quarter to the piston that develops the pressure. According to my invention I provide additional means operated by a hand lever for displacing an increased volume of the pressure liquid to boost the pressure already developed.

A further object of the invention is to provide means for insuring the proper operation of the apparatus by insuring the operation of the two controlling levers, that is, the foot lever and the hand lever, in the proper order.

A further object of the invention is to provide a master cylinder for hydraulic brakes of this type with a booster chamber to insure a full compression chamber when the compressing plunger moves forward and to provide means for relieving the pressure in advance of the booster head after the boosting effect has been attained, thereby enabling the entire force to be exerted in raising the pressure in the compression chamber.

A further object of the invention is to provide a construction for the brake drums at the wheels which will cooperate with apparatus for developing an unusually high hydraulic pressure so as to apply the braking forces to the drum in such a way that strains upon the braked element or flange are substantially balanced.

Further objects of the invention will appear hereinafter.

The invention consists in the novel parts and combination of parts to be described hereinafter, all of which contribute to produce an efficient hydraulic brake apparatus for heavy vehicles.

A preferred embodiment of the invention is described in the following specification, while the broad scope of the invention is pointed out in the appended claims.

Before proceeding to a detailed description of the invention, it should be understood that in practicing the invention I provide a hydraulic system for the automobile including any suitable piping leading to the wheel brakes. In addition to this, I provide foot-operated means for raising the pressure in the piping. I also provide hand-operated means for raising the pressure developed in the piping.

The brake bands at the brake drums of the wheels are preferably arranged so that a braking element rotating with the wheel, for example, a flange on the brake drum, receives a brake band or braking element on both sides so that the pressure of the bands against the brake element moving with the wheel is substantially balanced. This arrangement, although it is not essential, is most advantageous because it enables relatively light brake drums already in the car to be employed in utilizing a relatively high hydraulic pressure developed in the pipe system. This enables the invention to be readily installed in cars or trucks already in use.

Figure 1:
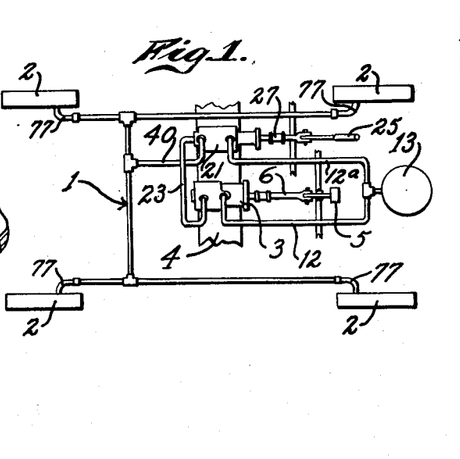
Figure 1 is a diagrammatic plan illustrating the apparatus as applied to a four-wheel brake installation.

Referring more particularly to the parts and especially to Figure 1, I represents the piping of a hydraulic system leading to the wheel brakes indicated at 2. In connection with this figure it should be understood that it is merely a diagram and at the forward wheels the piping would include the usual flexible connections to permit the wheels to be moved in steering.

Figure 2:
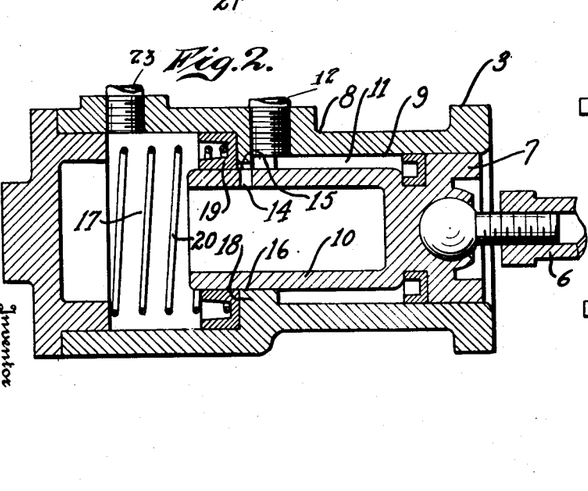
Figure 2 is a vertical section taken through a master cylinder which may be employed for raising the hydraulic pressure in the apparatus when operated by a pedal. This view shows portions of the operating link broken away.

In connection with the hydraulic system I include a pressure developing means which is preferably in the form of a master cylinder 3 which is mounted on the car frame 4 and arranged in such a way that it can be actuated by a foot pedal 5 one arm of which is attached by an adjustable strut link 6 to a piston 7 (see Figure 2). This pressure developing device 3 preferably includes a cylinder 8 having a bore 9 in which the piston 7 moves. The piston 7 preferably has a tubular extension 10 which cooperates with the bore 9 to form a chamber 11 which is in communication through a pipe 12 with a reservoir 13 (see Figure 1). This pipe 12 constitutes a portion of the piping system 1.

The tubular extension 10 of the piston 7 is open at its forward end and near its inner end it may be provided with a radial port 14. In the position of rest this radial port 14 is in communication with a small passage 15 extending longitudinally in the face of a guide bore 16 formed in the cylinder for guiding the tubular extension when the piston 7 is actuated. Through this port 14 communication is maintained, in the position of rest of the piston, between a pressure chamber 17 and the reservoir, thereby keeping the pressure chamber 17 completely full of the operating liquid. The passage 15, however, is located in the partition wall 18 so that as soon as the piston advances, the movement of the port 14 to the left (as viewed in Figure 2) will cut off communication between the chambers 11 and 17 and in this way the chamber 17 becomes closed so that as the piston advances the pressure in this pressure chamber will be raised.

In order to provide for packing the liquid, I provide a packing ring 19 in the form of a cup leather mounted as shown in Figure 2 and held in place by a coil spring 20.

In an ordinary hydraulic brake apparatus this pressure chamber 17 would be connected directly to the piping system, so that the pressure developed in the cylinder would be communicated to the hydraulic cylinders that apply the brakes at the wheels. According to my invention I provide means for raising this pressure above the pressure developed by the movement of this piston 7. This can be accomplished in any suitable manner, for example, by a special construction of the master cylinder.

However, in order to adapt the apparatus to be applied to hydraulic brake apparatus already installed, I prefer to employ a second cylinder 21 which may be considered a booster cylinder. This cylinder preferably has the typical construction illustrated in Figure 3 and is formed of a cylindrical shell having an inner head 22. Through this head 22 communication is had with the pressure chamber 17 through a pipe connection 23 forming a part of the piping system of the apparatus.

Figure 3:
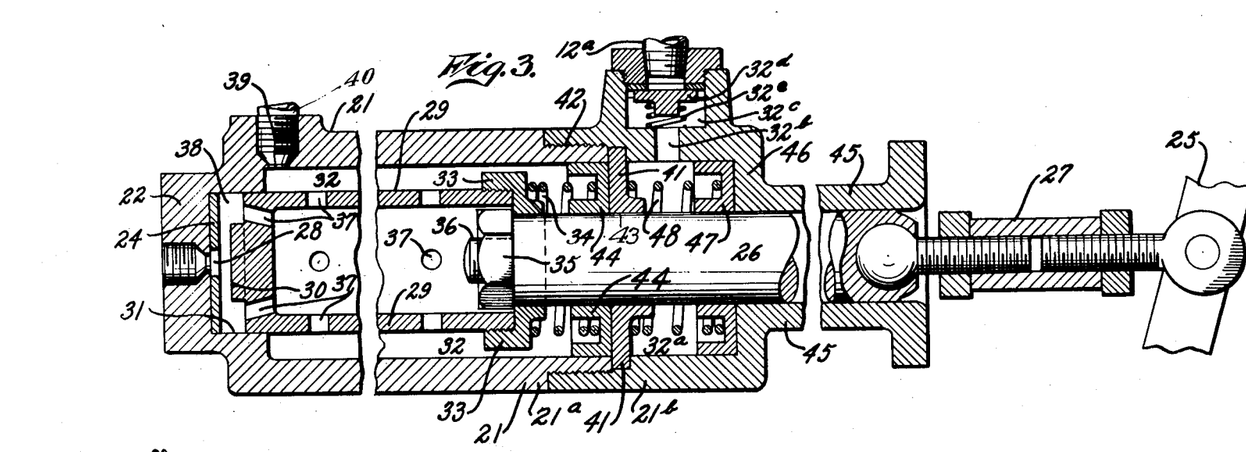
Figure 3 is a longitudinal vertical section through a booster cylinder, certain parts being broken away or shown in elevation.

Seating against the inner side of the head 22 I may provide a soft gasket or washer 24 for a purpose which will appear hereinafter.

The piston of this booster cylinder is operated by a second lever 25 which is preferably a hand lever, mounted in convenient reach of the driver of the car. In the present instance, as illustrated in Figure 1, this lever is located at the left side. However, it should be understood that in practice it may be located, if desired, on the right side, so as to be operated by the right hand of the driver. The handle arm of this lever is relatively long.

The piston of this cylinder is in the form of a plunger 26 connected by an adjustable connection 27 with the lever 25. This plunger 26 is of uniform diameter and at its inner end carries means operating when the plunger is advanced to close off communication through the inlet port 28 in the head 22 where the liquid is admitted from the chamber 17.

For this purpose I provide the inner end of the plunger 26 with a tubular extension 29 having a head 30 at its inner end that seats upon the gasket 24 when the plunger advances, thereby closing the inlet port 28. In this way the tubular extension 29 operates as a valve. Its forward end is preferably guided in a counter-bore 31 formed at the inner end of the bore 32 of the cylinder 21.

The extension 29 is mounted to slide freely on the plunger 26 and for this purpose its outer end is attached to a collar 33 having an opening through it that fits neatly on the plunger. A coil spring 34 is provided that holds the extension 29 in its extreme position toward the inner end of the plunger 26. In other words, this spring holds the collar 33 up against a stop nut 35 that screws onto a reduced threaded neck 36 on the end of the plunger.

The head 30 and the tubular wall of the extension 29 are provided with ports 37 which open communication with the end chamber 38 and the pressure chamber 32. When the plunger 26 is advanced toward the left to actuate the brakes, the movement of the nut 35 toward the left permits the spring 34 to advance the valve extension 29 so that after the plunger has advanced about from an eighth to a quarter of an inch, the head 30 will seat on the gasket 24 and close the opening 28. This will trap the liquid already compressed by the plunger 7 in the chamber 32 and the piping and wheel cylinders served by the piping, and further movement of the plunger 26 will compress this liquid further and develop a still higher pressure in the piping system.

In order to enable this to be accomplished, an outlet 39 is provided from the upper side of the cylinder 21 that is connected by a pipe 40 (see Figure 1) with the part of the piping system 1 that connects to the wheel brakes.

If desired, the spring 34 may seat directly against the outer head of the cylinder 21 but in order to provide against leakage that might occur around the plunger from using a higher pressure such as developed in this chamber 32, I prefer to provide a double head for the cylinder 21. For this purpose I provide an inner head 41 which may be held between two sections 21a and 21b of the cylinder 21 which are connected together by screw threads at a joint 42 (see Figure 3). The opening 43 through this inner head may be packed by means of a cup leather 44 against which the spring 34 seats.

The section 21b of the cylinder may be formed with a tubular guide neck 45 for the plunger connecting to a head 46 the opening through which is packed by means of a cup leather 47 held tight by means of a coil spring 48 in the outer end of the cylinder 21.

With this arrangement it will be evident that the two cup leathers 44 and 47 give two effective points of packing to prevent leakage of the liquid.

Figures 4, 5, 6:
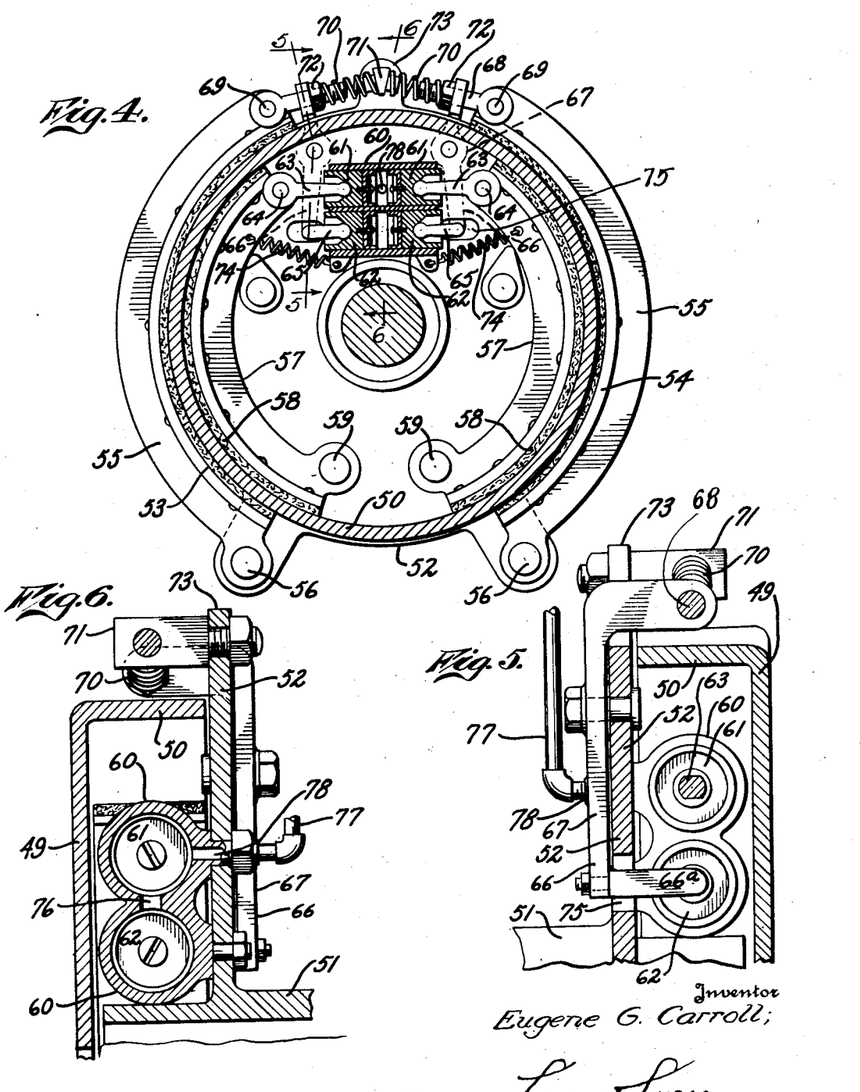
Figure 4 is a section taken through the axle at a brake drum and passing through the hydraulic brake cylinders, and illustrating the brake shoes or bands together with the means for forcing the same against the braked element.
Figure 5 is a section taken about on the line 5—5 of Figure 4 and further illustrating details of the construction.
Figure 6 is a section taken about on the line 6—6 of Figure 4 and further illustrating these details.

In the operation of these two cylinders 8 and 21 it is possible to develop a relatively high hydraulic pressure in the apparatus. In this connection it should be understood that in practice the piston or plunger 7 may readily be given a travel of about one and one-quarter inches, whereas the plunger 26 can readily be given a movement of about two and one-half inches. In this way a very considerable increase of pressure can be developed by the booster cylinder. This pressure in practice could be raised up to about 500 to 600 pounds per square inch. If such a pressure as this were applied to hydraulic brakes already installed, it might be that the brake drums, as usually designed to cooperate with pressures of 250 to 300 pounds per square inch, would be found to have a factor of safety that would be too low. According to my invention, I employ a brake at the wheels which provides means for applying the braking pressure on both sides of the braked element, thereby balancing the pressure and enabling this relatively high braking pressure to be employed on an ordinary brake drum without danger. In Figures 4 to 6 I illustrate a hydraulic brake of this type.

In these figures 49 indicates a brake drum rotating with the wheel and having a brake element in the form of a flange 50. The axle housing 51 is provided with the usual dust cover or plate 52 to which the relatively fixed brake elements or bands are anchored.

In the present instance I employ an outside band formed in two sections 53 and 54 mounted on the inner faces of two segmental shoes 55 that are mounted on anchor pins 56 on the sides of the plate 52. These brake bands or shoes 53 seat against the outer face of the flange 50 (see Figure 4) and on the inner face of the flange 50 I provide similar brake shoes 57 carrying brake bands or liners 58, and these shoes 57 are anchored on anchor pins 59 on the face of the disc 52. Hydraulic means is provided for simultaneously applying the inside and outside brake bands to the drum, thereby substantially balancing the pressure on the drum and relieving it of the great strains that it would otherwise be subjected to if this relatively high pressure were employed with a single inside brake or a single outside brake.

Any suitable hydraulic means may be employed for this purpose. In the present instance I employ twin cylinders 60 formed in a block (see Figure 6) and having open ends receiving plungers 61 and 62. The plungers or pistons 61 thrust on their outer sides against strut links 63 that are pivotally attached at 64 to the ends of the inner brake shoes 57. The outer sides of the pistons or plungers 62 actuate thrust links 65 that are pivotally attached to the actuating arms 66 of brake levers 67 the short arms of which are connected to links 68 pivotally connected at 69 to the free ends of the outside brake shoes 55.

Hold-off springs 70 are provided thrusting against a fixed abutment 71 and against nuts 72 to hold the outside brake shoes 55 away from the drum. These springs are, of course, compression springs. The abutment 71 is rigid with a radial ear 73 projecting out from the disc 52. The inner brake shoes 57 are normally held off by tension springs 74.

As indicated in Figure 5, the levers 67 are located on the outer side of the disc 52 and their long arms 66 have bent extensions 66a that pass in through openings 75 in the plate to permit them to connect with the strut links 65. The short arms of the levers 67 are similarly bent, as indicated in Figure 5.

The two cylinders 60 have a communicating port 76 between them (see Figure 6) so that if the hydraulic pressure in one of the cylinders is raised, it will be immediately communicated to the other. This enables me to use a single pipe connection 77 which may be connected to a port 78 admitting the operating liquid from the piping 1 (see Figure 6).

In this apparatus a low pressure is maintained in the reservoir 13 and this reservoir is in communication through a branch pipe 12a with a chamber 32a between the inner head 41 and the outer head 46 of the booster cylinder. This connection is made through a port 32b connecting to a valve chamber 32c having a check valve 32d that is held on its seat by a small coil spring 32e.

This spring is just of light force and permits the operating liquid to enter the chamber 32a, thereby maintaining the same full of the operating liquid. The cup leather 44 having its flanges projecting inwardly, as illustrated, is effective to pack the plunger 26 against pressure developed in the chamber 32 but it will readily permit leakage along the plunger from the chamber 32a. One advantage of providing the two heads 41 and 46 is that a double packing is provided for insuring that there will be no leakage from the right end of the cylinder as illustrated in Figure 3. In other words, the plunger 26 is packed at two points by the packing rings 44 and 47.

The mode of operation of the apparatus as illustrated in Figures 1 to 6 is substantially as follows: By pressing down on the pedal 5, the plunger 7 will be actuated and will move toward the left, as viewed in Figure 2. This will develop pressure in the operating liquid in the pressure chamber 17 and throughout the piping system. This may raise this pressure to approximately 250 to 300 pounds per square inch. This pressure is communicated through pipe 23 and through port 28 into the pressure chamber 32 and throughout the piping system. The driver then pulls upon hand lever 25, advancing plunger 26 toward the left (see Figure 3); as this plunger advances, the extension 29 seats against the gasket 24 and closes port 28, thereby trapping the high-pressure liquid in the chamber 32 so that further movement of the plunger 26 further raises the pressure.

In practice this movement of the plunger 26 may be approximately two and one-half inches which, by reason of the relatively small volume of the piping, and the great leverage of the long hand lever, enables me to increase greatly the hydraulic pressure that can be developed. This pressure is immediately communicated through the piping 1 to the twin cylinders 60 the plungers 61 and 62 of which will forcibly apply the brakes to the brake drum.

The application of the brakes simultaneously on opposite sides of the brake element or flange 50 operates to produce a balancing effect enabling this relatively high pressure to be applied to the drum without danger.

It will be evident that as soon as the plunger 26 has been advanced sufficiently to seat the head 30 on the gasket 24, the foot brake pedal 5 can be released.

When the hand-lever 25 is released, by reason of the effective area at the right end of the tubular extension 29 including the exposed area of the outer face of the nut 35, the plunger 26 will be moved toward the right by the hydraulic pressure and the nut 35 will eventually pull the extension 29 toward the right and restore the parts to substantially the position in which they are indicated in Figure 3. In other words, the effective area of the extension 29 holding it against the gasket 24 is merely the area of the reduced portion of the head 30 that comes upon the gasket or washer 24.

Figure 7:
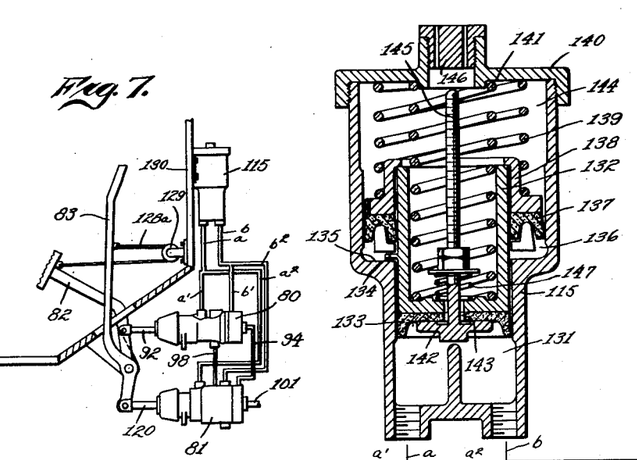
Figure 7 is a vertical section through a portion of an automobile body and indicating in side elevation an embodiment of the invention in which the two actuating levers are connected so as to correlate their movements.
Figure 8:
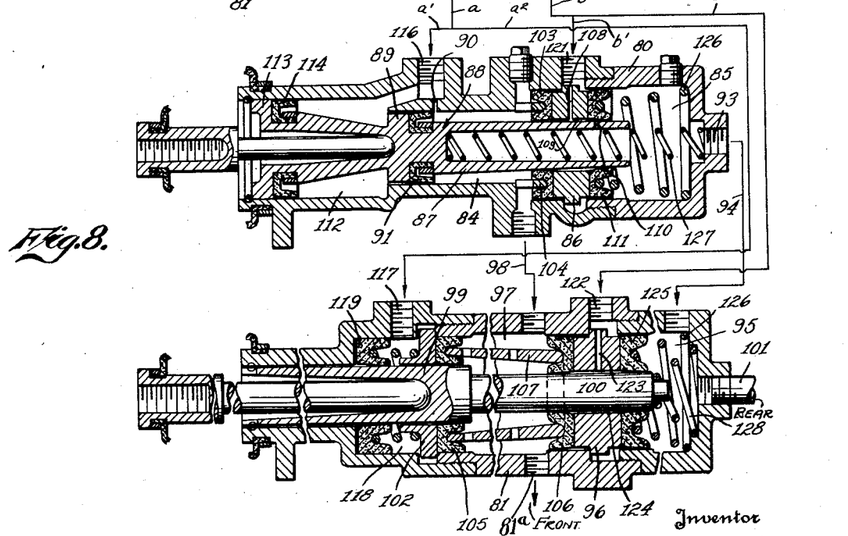
Figure 8 is a vertical section through parts of apparatus illustrated in Figure 7 and diametrically indicating the pipe connections.

In Figures 7 and 8 I illustrate another embodiment of the invention in which the operating liquid is compressed through the action of two levers which are connected so that their movement is correlated, this prevents any possibility of interfering with the proper action of the apparatus if the levers are operated in the wrong order. Such a connection as this is necessary on account of a certain port arrangement which characterizes the cylinder in which the rise of pressure is started. The apparatus illustrated in Figures 7 and 8 also includes a reservoir for the liquid that operates to maintain the hydraulic system normally under initial pressure. Referring to Figures 7 and 8, 80 and 81 indicate two cylinders, the former of which is intended to be actuated by a pedal or foot-lever 82 and the latter of which is intended to be actuated by a hand-lever 83. In practice these cylinders can be constructed so that either one of the levers is operated first. This is merely a matter of choice. However, the construction of the cylinder that is to be actuated first is somewhat different from the construction of the other cylinder as will now appear. In this embodiment of the invention I employ a floating piston which is advanced by the initial movement that starts the compression thereby giving a boost to the compression in the secondary chamber in which the pressure is fully developed. The cylinder 80 has within it a primary compression chamber 84 and a secondary compression chamber 85 and these chambers are separated by a floating head 86 to which is guided a cylindrical extension 87 forming part of a plunger 88, which plunger has a head 89 at its outer end which moves in the bore of the primary chamber 84.

When this plunger is in its retracted position as shown in Figure 8, a supply port 90 that supplies the operating liquid to the primary chamber 84 is located just in advance of the cup leather or packing 91 of the head 89. When pressure is exerted upon the pedal 82 the operating stem 92 of this cylinder forces the plunger 88 toward the right and as soon as the cup leather 91 passes the port 90 pressure will be developed in this chamber 84. This will cause a movement toward the right of the floating head 86 and thereby boost the pressure in the liquid in the secondary chamber 85. The further movement of the plunger will cause the cylindrical extension 87 to move further into the chamber 85 thereby increasing the pressure. The inner end of this cylinder is provided with an outlet 93 which if desired can be connected directly to the hydraulic brakes but which is preferably connected by a pipe 94 to a secondary chamber 95 formed in the cylinder 81.

If the outlet 93 is connected directly to the hydraulic brakes the chamber 84 would be a closed chamber but as illustrated in Figure 8 I utilize the pressure developed in the chamber 84 to cause the advance of a floating head 96 in the cylinder 81. This cylinder 81 has a primary chamber 97 corresponding to the primary compression chamber 84 and this chamber is connected by a pipe 98 with the primary chamber 84. In this way when the initial pressure is boosted in the chamber 84 the pressure is immediately communicated to the chamber 97.

In this way the floating head 96 would be caused to be moved to the right and boost the pressure in the chamber 95. The operation of the lever 83 thereafter will advance the plunger 98a which plunger has a rear portion 99 of enlarged diameter and a forward cylindrical extension 100 corresponding to the part 87 and this extension 100 passes through the floating head 96 and advances in the chamber 95 thereby increasing the pressure in this chamber which finds outlet to the brakes through outlet connections 101 and 81a. The enlarged portion or piston of the plunger 99 is guided through a fixed head 102 mounted in the cylinder 81.

The two primary chambers 84 and 97 are suitably packed against leakage. For this purpose the inner end of the chamber 84 is provided with a cup leather 103 that forms a stop and set for the floating head 86 when in its normal position illustrated in Figure 8. This cup leather is held in position by a metal ring 104 that is set in the inner end of the chamber 84.

The chamber 97 is packed by means of a cup leather 105 that seats against the adjacent face of the fixed head 102 and also by a cup leather 106 at the inner end of the chamber 97 and these cup leathers are held in place by a conical perforated keeper 107.

Means are provided for maintaing the chamber 85 full of the operating liquid at all times. For this purpose the floating head 86 is provided with an inlet port 108 which communicates with a port 109 in the guide opening for the cylindrical portion 87 of the plunger 88.

This port 109 communicates with a port 110 through the wall of the part 87 which is preferably made of tubular form as indicated. With this port arrangement it will be evident that in the retracted position of the plunger fluid can pass down through the port 108 (supplied from the reservoir as will be described hereinafter) but when the plunger 88 moves forward as soon as the port 110 passes the cup leather 111 that packs the inner face of the floating head 86 the liquid in the chamber 85 will be trapped and further compressed.

Leakage past the head 89 of the plunger 88 is caught in a chamber 112 back of the chamber 84 and the outer end of the plunger 88 is provided with a head 113 and a cup leather 114 moving in the bore of this chamber. This chamber 112 is always full of the operating liquid and on the forward movement of the plunger by reason of the head 113 no partial vacuum can be formed in this chamber 112 which might have the effect of inducing an outward flow from the chamber 84 through the port 90. This effect can be obtained by having the head 113 of the same diameter as the head 89 but I prefer to make this head 113 of larger diameter than the head 89 so that the forward movement of the head 113 will actually cause an increase in pressure in the chamber 112 thereby obtaining a surcharging effect and even causing a flow of the operating liquid down through the port 90 into the chamber 84 while the cup leather 91 is closing this port 90.

The chamber 112 and the port 90 are constantly supplied with the operating liquid from reservoir 115. In the present instance this is accomplished by providing a supply pipe $a$ that extends down from the lower end of the reservoir and has a branch $a'$ connecting to an inlet 116 that communicates with the chamber 112 and the port 90. Another branch pipe $a2$ extends off from the pipe $a$ and passes around to the rear end of the cylinder 81 where it connects to an inlet 117 supplying liquid to a power chamber 118 in the cylinder 81 through which the plunger 99 slides. This chamber 118 is packed on its outer side by a cup leather 119. In this way, leakage past the plunger 99 is prevented.

This plunger 99 is actuated in a manner similar to the plunger 88, that is to say, the short arm of the lever 83 operates it through the medium of a stem 120 (see Fig. 7).

Suitable means is provided for supplying the operating liquid to the secondary compression chambers 85 and 95. For this purpose, a supply pipe $b$ extends down from the lower end of the reservoir being provided with a branch pipe $b'$ that connects to an inlet 121 that communicates with the port 108 already described. This pipe $b$ has another branch $b2$ which extends around and connects to an inlet 122 on the cylinder 81 so as to admit the operating liquid to a radial port 123 in the floating head 96 which corresponds to the radial port 108. The cylindrical portion 100 of the plunger 99 fits loosely in a guide opening 124 in the floating head 96 so that the liquid coming down the port 123 readily forces its way past the packing leather or cup leather 125 that packs the inner end of the secondary compression chamber 95.

Suitable light coil springs 126 are provided in the secondary chambers 85 and 95 for holding their cup leathers against the floating heads.

In the cylinder 84 a long light coil spring 127 is provided that extends up into the interior of the tubular extension 87 and operates as a return spring for returning the plunger 88 after it has been advanced.

A similar "conical" light coil spring 128 is provided at the inner end of the plunger 99 to return it.

With the cylinders 80 and 81 constructed as described it will be evident that if the plunger 99 were operated before the plunger 88 no substantial pressure would be developed in the secondary chamber 95 because the liquid in it would not be trapped for the reason that it could find its way back through the pipe 94 into the secondary chamber 85 and thence through the ports 110, 109 and 108 into the reservoir and no pressure could be developed in the primary chamber 97 because a flow of liquid would be developed through the pipe 98 into the chamber 84 and thence through the port 90 back into the reservoir. For this reason, it is necessary to provide means for actuating the cylinder 80 before the cylinder 81. In this connection, however, it will be realized that if desired, the cylinder 80 could be actuated by a hand lever and the cylinder 81 by a foot lever. In order to prevent an accidental actuation of the hand lever 83 before the pedal 82 from forcing the liquid out of the cylinder, I connect these two levers so that the actuation of the lever 83 will immediately cause a forward movement of the plunger 88 thereby closing the ports 90 and 109.

Any suitable connection may be employed for this purpose. As illustrated in Figure 7, this connection consists of a flexible band 128a that is attached at its ends to the forward side of the levers 82 and 83 and passes in a loop around a guide pulley 129 attached to the dash 130 of the automobile. With this arrangement, it will be evident that as soon as the lever 183 is pulled rearwardly the pedal 82 will be pulled forwardly thereby closing the ports 90 and 109.

If desired the reservoir 115 may be merely an open reservoir carrying excess liquid under atmospheric pressure but I prefer to construct this reservoir so as to maintain a slight pressure, for example ten pounds per square inch as a normal initial pressure existing in the brake apparatus when at rest. For this purpose the lower end of the reservoir is formed into a receiving chamber 131 in the upper portion of which is guided a loose plunger 132 the lower end of which is packed by means of a suitable packing ring or cup leather 133. The side of this plunger 132 is provided with a stop finger 134 which engages an annular shoulder 135 within the reservoir to limit the downward movement of the plunger. Above the shoulder 135 an annular pressure chamber 136 is formed, the same being packed on its upper side by a cup leather 137 seating against a cover 138 that may be screwed down onto the upper end of the reservoir. The plunger 132 is pressed downwardly by a small coil spring 141, and a similar coil spring 139 presses the cover 138 down onto the packing 137.

In the bottom of the plunger 132 a relief valve 142 is provided which moves in an upward direction to close a relief opening 143 through the bottom of the plunger and which opens communication through the open upper end of the plunger, with the overflow chamber 144 in the upper end of the reservoir.

The valve 142 has a long threaded stem 145, the upper end of which lies adjacent to a fixed screw block 146 that screws into the cover 140 of the reservoir. With this arrangement, it will be evident that as the pressure in the receiving chamber 131 rises sufficiently the plunger 132 will be forced up to such an extent that the upper end of the stem 145 will strike the block 146 thereby opening the relief valve and permitting the liquid to flow up into the "cup" or interior of the plunger 132. The reservoir will operate effectively whether the plunger 132 overflows or not. If it does overflow the liquid can find its way past the cup leather 137 into the pressure chamber 136 from which it can pass down along-side of the loose plunger 132 back into the receiving chamber 131.

The relief valve 142 is normally held up on its seat by a small coil spring 147.

The mode of operation of the apparatus shown in Figures 7 and 8 will now be briefly described.

Assuming that the pedal 82 is operated first to apply the brakes, the stem 92 will move forward and thereby cause the plunger 88 to move forward, when this occurs a movement of liquid is developed from the chamber 112 toward the port 90 thereby slightly raising the pressure in the receiving chamber 131 of the reservoir and raising the pressure also at the inlet 118.

This prevents any outward flow of liquid through the port 90 in advance of the cup leather 91 as this cup leather is passing across this port. In this way, I insure that the actuation of the cylinder commences with the compression chambers completely full of liquid at the initial working pressure or slightly higher than that pressure.

As soon as the cup leather 91 has closed the port 90, pressure becomes developed in the primary chambers 84 and 97 thereby causing the movement of the floating heads (86 and 96) toward the right, compressing the liquid in the secondary compression chambers 85 and 95 thereby developing pressure in the brake pipe 101 leading off from the cylinder 81. This pressure developed by the plunger 88 is immediately augmented by the pressure developed when the hand lever 83 is actuated. The actuation of the lever 83 of course causes an advance of the plunger 99, the forward portion 100 of which moves into the chamber 95 thereby constantly raising the pressure in the two chambers 85 and 95 and in the brake pipe 101.

In Figure 8 it will be noted that the floating pistons or heads 86 and 96 divide their cylinders into chambers 84 and 85, and 97 and 95 respectively. The chambers 84 and 97 are connected through the pipe indicated by line 98. In dual type brakes the outlet 81a from the chamber 97 would be connected to the forward brakes while the chamber 95 would be connected to the rear brakes only. In this way the principal boosted pressure is applied to the rear brakes.

It is understood that the embodiment of the invention described herein is only one of the many embodiments this invention may take, and I do not wish to be limited in the practice of the invention, nor in the claims, to the particular embodiment set forth.

What I claim is:

1. In a hydraulic brake apparatus, the combination of hydraulic means for holding a liquid under pressure, a pair of levers constructed to be actuated respectively by one's hand and one's foot, means connected with one of the levers for raising the pressure in the liquid, means connected with the other lever and acting through a different mechanical ratio for raising the pressure in the liquid, and means connecting the levers.

2. In a hydraulic brake apparatus, the combination of a hydraulic device having a chamber for holding a liquid under pressure, foot-actuated means for raising the pressure in the said chamber, hand-actuated means acting through a different mechanical ratio for raising the pressure in said chamber, and means for operatively connecting the foot-actuated means and the hand-actuated means so as to correlate their movements.

3. In a hydraulic brake apparatus, the combination of a foot-actuated hydraulic cylinder, a foot-lever for actuating same to raise the pressure in the cylinder, a hand-actuated hydraulic cylinder, a hand-lever for actuating the same, one of said cylinders having a pressure chamber in which the liquid is compressed, with a movable plunger therein for compressing the liquid and having a port for supplying liquid to the interior of the cylinder in advance of the said plunger, whereby the forward movement of the plunger traps the liquid in the chamber and compresses the same, means connecting the said cylinders for developing pressure in the other cylinder when said plunger is actuated, the other cylinder operating to raise the pressure developed in the same by the first cylinder.

4. In a hydraulic brake apparatus, the combination of a foot-actuated hydraulic cylinder, a foot-lever for actuating the same to raise the pressure in the cylinder, a hand-actuated hydraulic cylinder, a hand-lever for actuating the same, one of said cylinders having a pressure chamber in which the liquid is compressed with a movable plunger therein for compressing the liquid, and having a port for supplying liquid to the interior of the cylinder in advance of the said plunger whereby the forward movement of the plunger traps the liquid in the chamber and compresses the same, means connecting the said cylinder for developing pressure in the other cylinder when the cylinder having said plunger is actuated, the actuating lever of said second cylinder operating to raise the pressure developed in the same by the first cylinder, a source of supply of liquid connected with the cylinder having the plunger, and means connecting said levers to cause a forward movement of the said plunger when the actuating-lever of the second-named cylinder is actuated.

5. In an apparatus for applying hydraulic brakes, the combination of a primary compression chamber and a secondary compression chamber, a plunger guided to move in said chambers and having a head in the primary chamber, a movable head separating the said chambers and moved by the pressure developed in the primary chamber to increase the pressure developed in the liquid in the secondary chamber, and means for connecting the secondary chamber to the point where the hydraulic brakes are to be applied.

6. In an apparatus for applying hydraulic brakes, the combination of a primary compression chamber and a secondary-compression chamber, a plunger guided to move in said chambers and having a head in the primary chamber, a movable head separating the said chambers and moved by the pressure developed in the primary chamber to increase the pressure developed in the liquid in the secondary chamber, a third chamber having a lever corresponding thereto with means actuated by the lever for raising the pressure of fluid in the same and having means for connecting the same with the brakes.

7. In a hydraulic brake apparatus, the combination of a hydraulic device having a primary compression chamber and a secondary compression chamber, a plunger guided to move in said chambers, a floating head through which the said plunger moves and separating the primary chamber from the secondary chamber, a second hydraulic device having a primary compression chamber and a secondary compression chamber with a plunger guided to move in said chambers, a floating head in said hydraulic device separating its primary and secondary chambers, and through which its plunger is guided, a lever for actuating the plunger of the first hydraulic device, means connecting the secondary chamber of the first hydraulic device with the secondary chamber of the second hydraulic device, and a lever for actuating the plunger of the second hydraulic device to cooperate in raising the pressure in the operating liquid developed in the secondary chamber of the first-named hydraulic device.

8. In a a hydraulic brake apparatus, the combination of a hydraulic device having a primary compression chamber and a secondary compression chamber, a plunger guided to move in said chambers, a floating head through which the said plunger moves and separating the primary chamber from the secondary chamber, a second hydraulic device having a primary compression chamber and a secondary compression chamber with a plunger guided to move in said chambers, a floating head in said hydraulic device separating the primary and secondary chambers, and through which its plunger is guided, a lever for actuating the plunger of the first hydraulic device, means connecting the secondary chamber of the first hydraulic device with the secondary of the second hydraulic device, a lever chamber of the second hydraulic device, a lever for actuating the plunger of the second hydraulic device to cooperate in raising the pressure in the operating liquid developed in the secondary chamber of the first-named hydraulic device, and means for connecting the primary compression chambers of said hydraulic devices to enable the pressure developed in the primary compression chamber of the first-named hydraulic device to develop pressure in the primary chamber of the second-named hydraulic device and thereby cause a forward movement of its floating head to boost the pressure in the secondary chamber of the second-named hydraulic device.

9. In a master cylinder for applying hydraulic brakes, the combination of a cylinder shell having a primary compression chamber and a secondary compression chamber with a floating head separating the said chambers, a plunger guided to slide through the said floating head and having a head operating in the primary chamber, whereby the advance of said plunger compresses the operating liquid in the primary chamber, causing a forward movement of the floating head to raise the pressure of the operating liquid in the secondary chamber, the forward end of said plunger operating thereafter to raise the pressure in the secondary chamber, and means for connecting the secondary chamber with the brakes.

10. In a master cylinder for applying hydraulic brakes, the combination of a cylinder shell having a primary compression chamber and a secondary compression chamber with a floating head separating the said chambers, a plunger guided to slide through the said floating head and having a head operating in the primary chamber, whereby the advance of said plunger compresses the operating liquid in the primary chamber, causing a forward movement of the floating head to raise the pressure of the operating liquid in the secondary chamber, the forward end of said plunger operating thereafter to raise the pressure in the secondary chamber, means for connecting the secondary chamber with the brakes, a cup leather within the secondary chamber seating against the adjacent face of the floating head, and means for supplying operating liquid to the secondary chamber through the said floating head and past the said cup leather.

11. In a master cylinder for applying hydraulic brakes, the combination of a cylinder shell having a primary compression chamber and a secondary compression chamber with a floating head separating the said chambers, a plunger guided to slide through the said floating head and having a head operating in the primary chamber, whereby the advance of said plunger compresses the operating liquid in the primary chamber, causing a forward movement of the floating head to raise the pressure of the operating liquid in the secondary chamber, the forward end of said plunger operating thereafter to raise the pressure in the secondary chamber, means for connecting the secondary chamber with the brakes, said floating head having a port therein for supplying operating liquid to the secondary chamber, and said plunger having a tubular wall with a port therethrough communicating with the port in said floating head when the plunger is in its retracted position, said plunger cooperating with the port in the floating head to cut off escape of liquid from the secondary chamber when the plunger advances to compress the liquid in the secondary chamber.

12. In an apparatus for applying hydraulic brakes, the combination of a supply reservoir, a master cylinder having a primary compression chamber and a secondary chamber with a floating head separating the same, a plunger having a head moving in the primary chamber and having a cylindrical extension passing through the said floating head and extending into the secondary compression chamber, means for supplying operating liquid from the reservoir to both of said compression chambers when the plunger is in its retracted position, said means cooperating with the plunger to cut off escape of liquid back into the reservoir when the plunger is advanced, the forward movement of said plunger operating to raise the pressure in the primary compression chamber and move the floating head forward to boost the pressure in the secondary compression chamber before the advance of the said cylindrical portion of the plunger substantially raises the pressure in the secondary compression chamber, and means for connecting the secondary compression chamber with the brakes.

13. In an apparatus for applying hydraulic brakes, the combination of a supply reservoir, a master cylinder having a primary compression chamber and a secondary chamber with a floating head separating the same, a plunger having a head moving in the primary chamber and having a cylindrical extension passing through the said floating head and extending into the secondary compression chamber, means for supplying operating liquid from the reservoir to both of said compression chambers when the plunger is in its retracted position, said means cooperating with the plunger to cut off escape of liquid back into the reservoir when the plunger is advanced, the forward movement of said plunger operating to raise the pressure in the primary compression chamber and move the floating head forward to boost the pressure in the secondary compression chamber before the advance of the said cylindrical portion of the plunger substantially raises the pressure in the secondary compression chamber, means for connecting the secondary compression chamber with the brakes, and means associated with the reservoir for developing a predetermined initial pressure in the operating liquid.

14. In an apparatus for applying hydraulic brakes, the combination of a supply reservoir for the operating liquid, a master cylinder having a primary compression chamber and a secondary compression chamber with a floating head separating the said chambers, a plunger with a rear head moving in the primary chamber and having a tubular extension passing into the secondary compression chamber, said primary chamber having a port for supplying liquid from the reservoir located just in advance of the said rear head, said floating head having a supply port connected with the reservoir and said tubular extension having a port communicating with the last-named port when the plunger is in its retracted position, and means for connecting the secondary compression chamber with the brakes.

15. A master cylinder for hydraulic brakes having a forward compression chamber and a rearward compression chamber, a plunger having a head working in the rear compression chamber with means cooperating with the same to compress operating fluid and force the same into the forward compression chamber, said plunger having an extension moving in the forward compression chamber for raising the pressure of the fluid therein, said cylinder having another chamber back of the rear compression chamber, and said plunger having a head moving therein, the rear end of the cylinder being open to the atmosphere beyond said last named head, and means for opening communication between the last named chamber and the rear chamber when the plunger is in its retracted position.

16. In hydraulic brake apparatus, a cylinder for fluid, means including a piston for applying pressure to said fluid, means including a separate piston having a smaller diameter for applying additional pressure to said fluid, means associated with one of said pistons for trapping a quantity of fluid previously supplied by the other said piston, and separate levers controlling the two pistons.

17. In a hydraulic braking system, means for displacing a relatively large body of fluid, means interposed in said system for trapping a portion of said fluid ahead of said trapping means, and separately controlled means for applying additional pressures to the trapped fluid.

18. In hydraulic brake apparatus, a brake, a wheel cylinder for applying said brake, a master cylinder, a connection between said master cylinder and said wheel cylinder, a piston in said master cylinder provided with a cup packing facing forward whereby fluid may be forced forward past said piston but may not return rearward past the piston, a manually operated lever, connections between said lever and said piston for moving said piston responsive to movement of said lever, a fluid reservoir, and means unconnected with said lever for forcing fluid to flow from said reservoir past said piston into said cylinder and said connections.

19. In hydraulic brake apparatus, a wheel cylinder, a pair of master cylinders, fluid connections between said master cylinders, and said wheel cylinder, a pedal lever adapted to operate one of said master cylinders, a hand lever adapted to operate the other master cylinder, and means associated with one of said master cylinders for trapping therein a quantity of fluid previously supplied thereto from the other said master cylinder.

20. In hydraulic brake apparatus, a wheel cylinder, a master cylinder having connections leading to said wheel cylinder, a booster cylinder having connections leading to said master cylinder, means for operating said master cylinder and said booster cylinder, and means associated with said master cylinder for trapping therein a quantity of liquid previously supplied thereto from said booster cylinder.

21. In a hydraulic brake system, a wheel cylinder, a master cylinder having fluid connections with said wheel cylinder, a booster cylinder having fluid connections with said master cylinder, a foot pedal adapted to operate said master cylinder, a hand lever adapted to operate said booster cylinder, and means operated by said hand lever for operating said foot pedal.

22. In hydraulic brake apparatus, a master cylinder, an annular head mounted for reciprocation in said master cylinder and dividing said master cylinder into a pair of chambers, connected pistons operated in said chambers respectively to produce brake pressures therein, and means for limiting the reciprocatory motion of said head whereby under normal operating conditions pressures are equalized in said chambers, but whereby when pressures are abnormally lowered in one of said chambers pressure may be maintained in the other chamber.

23. In hydraulic brake apparatus, a master cylinder, an annular head mounted for reciprocation in said master cylinder and dividing said master cylinder into a pair of chambers, connected pistons operated in said chambers respectively to produce brake pressure therein, means for limiting the reciprocatory motion of said head and a spring for normally maintaining said head against one of said limiting means, whereby under normal operating conditions pressures are equalized in said chambers, but whereby when pressures are abnormally lowered in one of said chambers pressure may be maintained in the other chamber.

EUGENE G. CARROLL.